United States Patent
Lee

(10) Patent No.: US 6,757,737 B2
(45) Date of Patent: Jun. 29, 2004

(54) APPARATUS AND METHOD FOR PROVIDING MEASURED RATE SYSTEM IN IP NETWORK

(75) Inventor: Hoon Lee, Daejeon-shi (KR)

(73) Assignee: Korea Telecommunication Authority, Kyunggi-do (KR)

( * ) Notice: Subject to any disclaimer, the term of this patent is extended or adjusted under 35 U.S.C. 154(b) by 174 days.

(21) Appl. No.: 09/747,292

(22) Filed: Dec. 21, 2000

(65) Prior Publication Data

US 2002/0099848 A1 Jul. 25, 2002

(30) Foreign Application Priority Data

Dec. 5, 2000 (KR) ........................................ 2000-73180

(51) Int. Cl.[7] .............................................. G06F 15/16
(52) U.S. Cl. ........................ 709/232; 709/241; 705/34
(58) Field of Search ................................ 709/232, 241; 705/34

(56) References Cited

U.S. PATENT DOCUMENTS

| | | | | | |
|---|---|---|---|---|---|
| 5,430,794 | A | * | 7/1995 | Ayame | 379/112 |
| 5,583,792 | A | * | 12/1996 | Li et al. | 709/224 |
| 5,943,320 | A | * | 8/1999 | Weik et al. | 370/259 |
| 6,047,051 | A | * | 4/2000 | Ginzboorg et al. | 379/130 |
| 6,078,268 | A | * | 6/2000 | Koga | 340/825.44 |
| 6,338,046 | B1 | * | 1/2002 | Saari et al. | 705/34 |
| 6,405,257 | B1 | * | 6/2002 | Gersht et al. | 709/235 |
| 6,490,287 | B1 | * | 12/2002 | Kilkki | 370/395.42 |
| 6,519,636 | B2 | * | 2/2003 | Engel et al. | 709/223 |

* cited by examiner

*Primary Examiner*—Hosain Alam
*Assistant Examiner*—Liang-che Wang
(74) *Attorney, Agent, or Firm*—Merchant & Gould, P.C.

(57) ABSTRACT

An apparatus and method for providing a measured rate system in an IP network is disclosed, in which a charging system is provided by a measured rate system in accordance with various quality of services provided to customers in a public internet network system. The apparatus for providing a measured rate system in an IP network includes; a traffic type divider for dividing traffic transmitted and received between a customer network or customer equipment and the IP network, in accordance with service types; a traffic measuring and statistical processing unit for measuring traffic use amount by traffic data divided from the traffic type divider and generating statistical data required for charging system; a tariff function unit for providing a tariff function which determines fee rate per unit band; a unit fee determining unit for determining unit fee in accordance with traffic types by applying the tariff function of the tariff function unit based on a charging policy of the measured rate system; and a final charging calculating unit for determining final use fee which will be charged to the customer, through data calculated by the traffic measuring and statistical processing unit, the tariff function unit, and the unit fee determining unit.

3 Claims, 3 Drawing Sheets

<LINEAR PROPORTIONAL FEE RATE SYSTEM>

<NON-LINEAR DOUBLE CHARGING FEE RATE SYSTEM>

APPARATUS AND METHOD FOR PROVIDING MEASURED RATE SYSTEM IN IP NETWORK

BACKGROUND OF THE INVENTION

1. Field of the Invention

The present invention relates to a charging system of internet services in IP network, and in particular, to an apparatus and method for providing a measured rate system in an IP network, in which the charging system is operated by measuring a traffic type and traffic amount used by a customer in a router for allowing the customers in a public Internet network system.

2. Description of the Related Art

An Internet network consisting of an IP router has been developed to provide application services of a non-audio data service system free of charge. However, audio and video services (AOD/VOD Service), which are real time services, as well as super high speed Internet services have not been available until recently by various Internet Service Providers (ISP) and commercial networks.

Such services based on the IP router include application services such as Internet phones and video phones, which require real time process, and application services, such as Internet web browsing, file data transfer, image transfer, e-mail transfer, and video on demand (VOD) download, which do not require real time process.

The services such as Internet telephones and video telephones should satisfy very small packet loss and delay time conditions. On the other hand, the services such as Internet web browsing should ensure constant service rate and response time. In this respect, it is necessary to introduce a charging system differentiated depending on user's desired quality of service.

However, the current Internet services have some problems in that most of the communication service fees are charged based on a fixed fee system and it is difficult to measure traffic due to various service types and charge the fee.

SUMMARY OF THE INVENTION

Accordingly, the present invention is directed to an apparatus and method for providing a measured rate system in an IP network, that substantially obviate one or more of the problems due to limitations and disadvantages of the related art.

An object of the present invention is to provide to an apparatus and method for providing a measured rate system in an IP network, in which a charging system is provided by a measured rate system in accordance with various quality of services provided to customers in a public internet network system.

Another object of the present invention is to an apparatus and method for providing a measured rate system in an IP network, in which a charging system is provided in accordance with quality of services measured in a router.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, an apparatus for providing a measured rate system in an IP network according to the present invention includes; a traffic type divider for dividing traffic transmitted and received between a customer network or customer equipment and the IP network, in accordance with service types; a traffic measuring and statistical processing unit for measuring traffic use amount by traffic data divided from the traffic type divider and generating statistical data required for charging system; a tariff function unit for providing a tariff function which determines fee rate per unit band; a unit fee determining unit for determining unit fee in accordance with traffic types by applying the tariff function of the tariff function unit based on a charging policy of the measured rate system; and a final charging calculating unit for determining final use fee which will be charged to the customer, through data calculated by the traffic measuring and statistical processing unit, the tariff function unit, and the unit fee determining unit.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
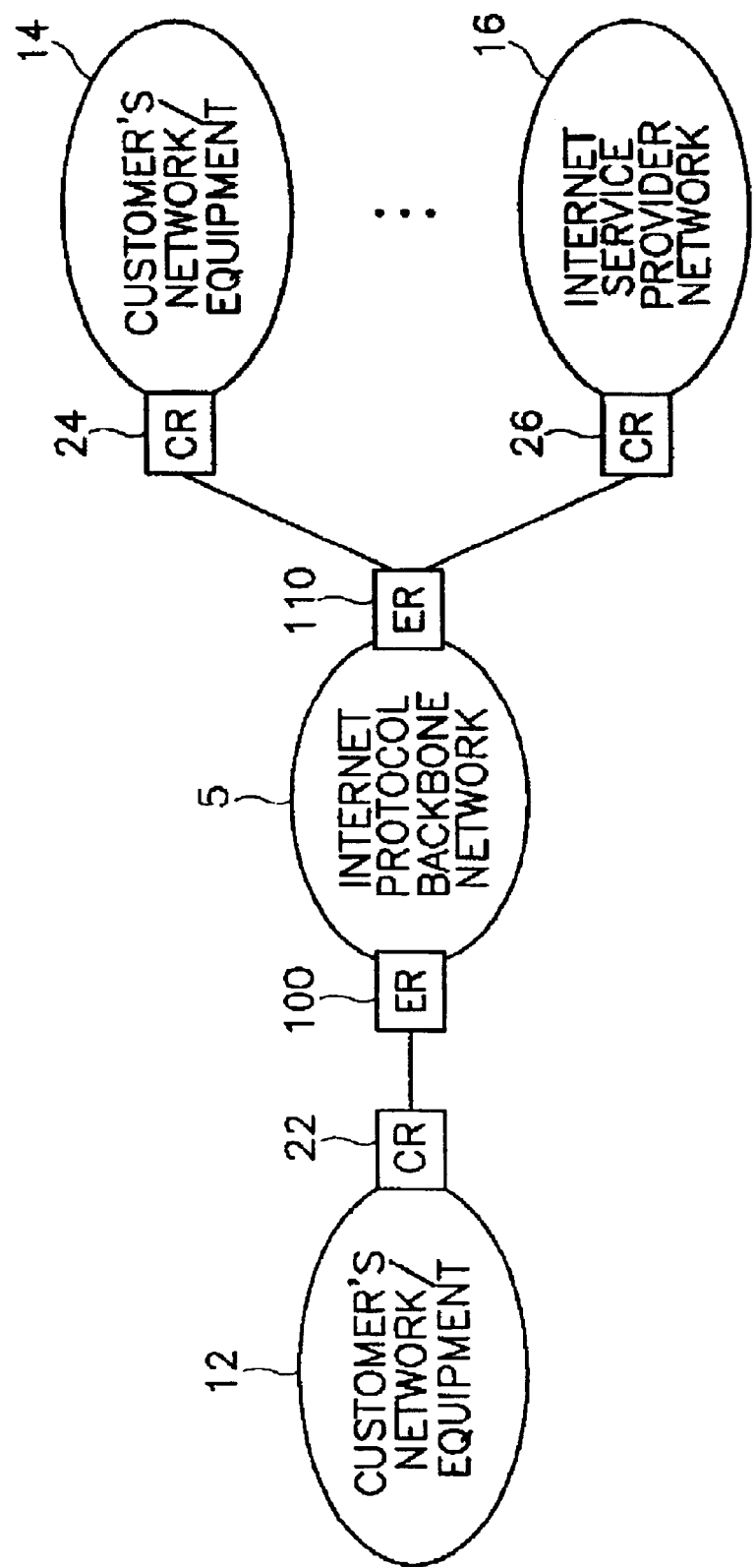
FIG. 1 is a diagram showing IP network according to the embodiment of the present invention.

FIG. 1 is a diagram showing IP network according to the embodiment of the present invention. The IP network of the present invention includes, core routers 22, 24 and 26 connected with a communication network provider connected with a public communication provider, for receiving Internet services, for transmitting packet data to a host or server, and an edge router 100 of an Internet protocol backbone network 5 connected with the core routers 22, 24, and 26, for controlling introduction of customer's traffic to network and monitoring and measuring band use amount of a customer.

The communication network customer includes a customer's network 12, a customer's equipment, or Internet service provider network.

In the charging services of the present invention, the communication service fee is charged by a measured rate tariffing policy not a related art fixed fee charging tariffing policy which depends on marketing and price policies in the art. According to the measured rate tariffing policy, the communication service fee is charged depending on customer's traffic types and use amount. The measured rate tariffing policy includes a first rule, a second rule and a third rule.

According to the first rule, in even case that a transmitter charges the communication service fee, the network provider charges the communication service fee for a packet that passes through an edge node of a receiver, in proportional to use band. The communication service fee applies to both transmitted and received data.

According to the second rule, the communication service fee is charged in proportional to the use amount. In case that load generated by the customer is smaller than a maximum allowed speed, the communication service fee is calculated at low cost at a greater rate. By contrast, if the load is relatively great, it is possible to reflect statistical multiplexing characteristic of a band that can charge the communication service fee at even more expensive cost than the maximum cost. In the statistical multiplexing characteristic, multiplexing speed can be increased in a case where a plurality of low speed lines are multiplexed as compared with a case where a small number of high speed lines are multiplexed.

According to the third rule, in even case that the same band resource is used in the same manner as the charging system of a general Internet customer and a private line customer, services assuring quality of services should perform network function related to quality control. Accordingly, the communication service fee is charged according to beneficiary's charging policy.

Figure 2:
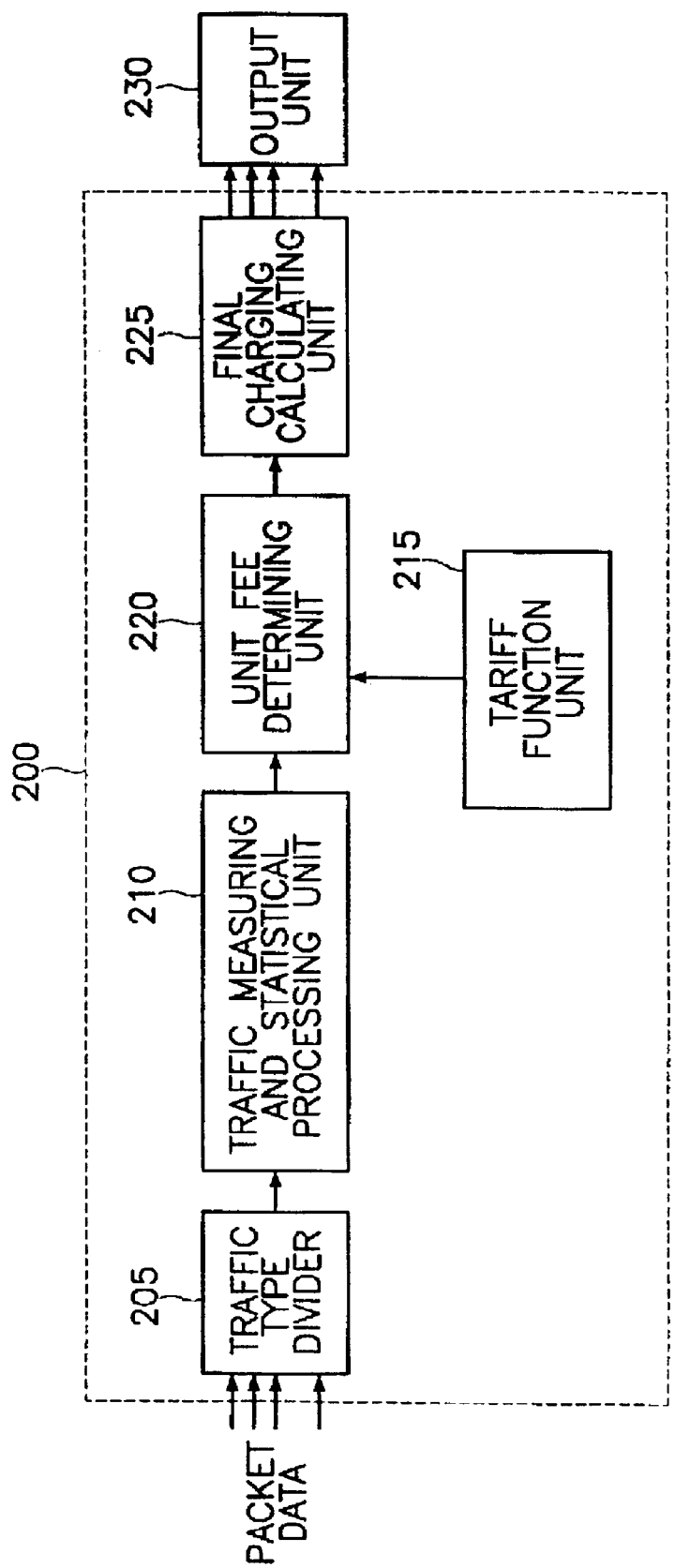
FIG. 2 is a block diagram showing a charging service unit provided in an edge router of FIG. 1.

FIG. 2 is a block diagram showing a charging service unit 200 provided in the edge router of FIG. 1. The charging service unit 200 includes a traffic type divider 205 for receiving traffic transmitted from the customer to the Internet protocol backbone network 100 and dividing the traffic in accordance with the customer and service types through packet header data which stores characteristics of packet of a corresponding traffic, a traffic data processor for measuring traffic use amount of the network customer in accordance with the traffic types and processing statistical data required for charging system, a tariff function unit 215 for providing a tariff function which determines fee rate per unit band, a unit fee determining unit 220 for determining unit fee in accordance with traffic types by applying the tariff function of the tariff function unit 215 based on a tariffing policy of the measured rate system, and a final charging calculating unit 225 for determining final use fee which will be charged to the customer, through data calculated by the traffic measuring and statistical processing unit 210, the tariff function unit 215, and the unit fee determining unit 220, and transmitting the final use fee to an output unit (i.e., printer and PC) 230.

Since the traffic type divider 205 has different requirements of services provided by the Internet network, a personal customer and an enterprise customer are divided in accordance with types of the customer. The traffic type divider 205 also divides traffic types in accordance with services required by the customer. This is shown in Table 1.

TABLE 1

| Customer | Services | Traffic types |
| --- | --- | --- |
| Personal customer | Services, such as Internet phones and video phones, which require real time data. | Band reservation type |
| | Services, such as e-mail, file transfer protocol(FTP), web browsing, image transfer, VOD download, which do not require real time data. | Band common type |
| Enterprise customer | Services, such as Virtual Private Networking, which conform to virtual private network. | Virtual Private Line |

In Table 1, the traffic type divider 205 divides traffic transferred from the customer into a band reservation type, a band common type, and a virtual private line in accordance with services requested by the customer.

The traffic measuring and statistical processing unit 210 varies a traffic measuring and statistical processing method in accordance with the divided traffic types. The measuring items and statistical processing method in accordance with the traffic types is as below Table 2.

TABLE 2

| Traffic types | Measuring items | Statistical process |
| --- | --- | --- |
| Band reservation type | Connection duration (unit: sec or msec) | Sum of total connection time |
| Band common type | Amount of data transmitted and received during connection duration (unit: bits) | Sum of the number of total bits of transmitted and received data |
| Virtual private line | Amount of transmitted and received data and amount of lost data (unit: bits), occupation rate of buffer | Average and dispersion of data (unit: bits), packet loss rate, average delay time |

In Table 2, in the band reservation type traffic, connection duration (T), which is total required time until a corresponding traffic is released after the traffic connection starts, is calculated for each unit of second.

In the band common type traffic, total transfer amount A which is sum (unit: bit) of traffic transmitted and received by the customer during measuring time from connection of traffic to release of traffic. At this time, the transmitted traffic is an amount of traffic transmitted from the customer to the network, and the received traffic is an amount of transmitted from the network to the customer.

Furthermore, in the virtual private line traffic, an equivalent band C is calculated to simultaneously satisfy average packet loss rate and average packet delay requested by the customer of the virtual private line. The equivalent band represents average(m) and dispersion($v^2$) of the transmitted and received traffic, and packet loss rate. The equivalent band required to satisfy the packet loss rate is as below Equation 1.

$$C_{loss}=(-K+(K^2+d(2mK+r))^{0.5})/d \qquad \text{Equation 1}$$

In Equation 1 above, $C_{loss}$ acts as an equivalent band required to ensure packet loss rate, K denotes the size of a buffer, d denotes –logL, L denotes packet loss target value, r denotes $d(v^2+m^2)$, m denotes average packet arrival rate, and $v^2$ denotes dispersion of arrival rate.

The equivalent band required to satisfy the average packet delay value $C_{delay}$ is as below Equation 2. A method for calculating the packet delay value is disclosed in "Hoon Lee, "Charging principles for the QoS-sensitive service in broadband networks", Journal of Electronical Engineering and Information Sciences, Vol. 5, No. 3, June 2000 (hereinafter, referred to as publication material)." The calculating method skipped in Equation 2 below refers to the publication material.

$$C_{delay}=(e^{-p0}+e^{-p1}+e^{-p2}+\ldots e^{-pK-1})/d \qquad \text{Equation 2}$$

In Equation 2, p denotes attenuation rate and is obtained by Equation 3 below.

$$p=2(C_{loss}-m)/(v^2+m^2-C_{loss}^2) \qquad \text{Equation 3}$$

If service requirements are any one of packet loss rate and average packet delay, the above equation 1 or 2 is selected in accordance with a corresponding band. If the two are requested, an equivalent band C calculated by Equation 4 below is applied.

$$C=\text{Max}[C_{loss}, C_{delay}] \qquad \text{Equation 4}$$

As described above, one of the Equations 1, 2, and 4 is selected in accordance with Internet service requirements of the virtual private line traffic customer, so that the equivalent band is obtained.

Figure 3A:
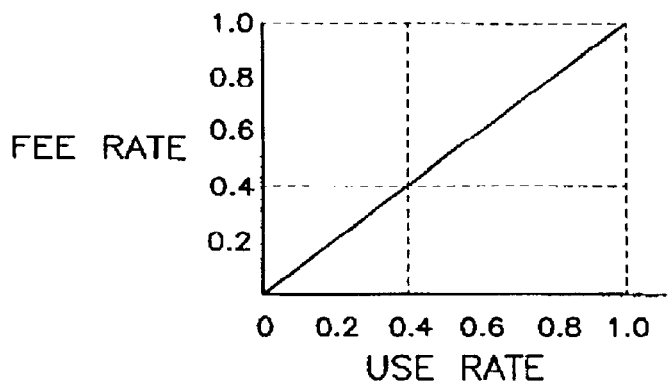
FIGS. 3A and 3B are the graphs applied in the charging service unit of FIG. 2.
Figure 3B:
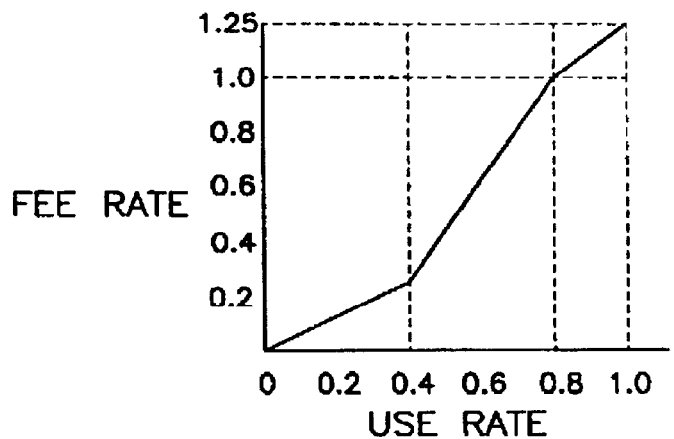

FIGS. 3A and 3B are graphs showing a charging system by the charging service unit 200 of FIG. 2. Referring to FIGS. 3A and 3B, a linear proportional fee rate system and a non-linear double charging fee rate system, which are the tariff function of the tariff function unit 215, are shown as fee rate according to use rate.

FIGS. 3A and 3B are applied when the unit fees of the band common type traffic and the virtual private line traffic are calculated. The equations for calculating use fee and fee rate are as below Equations 5 and 6.

Use rate=actual use band amount/maximum use available band    Equation 5

Fee rate=actual charging fee/maximum charging available fee    Equation 6

In FIG. 3A, a linear proportional fee rate system based on linear function is shown. It is noted that the fee rate increases with the increase of the use rate. For example, if the traffic use rate of the customer calculated by the traffic measuring and statistical processing unit 210 is 0.4, the fee corresponding to 40% of the maximum charging available fee charged based on the fixed fee system is charged to the customer.

In FIG. 3B, a non-linear double charging fee rate system based on non-linear function is shown. An increase slope of the fee rate is partially varied depending on the use rate unlike the linear proportional fee rate system. This is because of marketing policies and price competitiveness. Designation of use amount section for designating the same slope of the non-linear function, the slope for the designated section, and the fee rate are varied.

The unit fee determining unit 220 calculates the unit fee according to the respective traffic types using the tariff function.

The unit fee according to the traffic types will now be described.

First, the unit fee R of the band reservation type traffic is indicated as the unit fee per second for the maximum connection rate based on the band of the maximum value (absolute value) of the traffic available by connection of the corresponding traffic.

For example, in case of an Internet phone user, the maximum rate, such as 64 Kbps, 32 Kbps, and 8 Kbps, varies depending on a coding method. Accordingly, the fee is based on the voice phone fee at the time of charging. Alternatively, the fee is based on the marketing policies of the enterprise. For example, if the fee of the voice phone based on 64 Kbps line is 50 per minute, the unit fee of the band reservation type traffic is 50 W/60 min.

The unit fee B of the band common type traffic represents fee per unit bit. At this time, the fee per unit bit is calculated by the tariff function based on the fixed fee system for existing Internet services. Alternatively, the fee per unit bit follows the fee standard by the marketing policies.

The unit fee S of the virtual private line traffic represents the fee per unit band speed (bps). The unit band speed follows the amount calculated based on the fee per the existing private line speed.

The fee system of the existing Internet private line charges a fixed fee at a constant speed, such as 64 Kbps, 128 Kbps, 256 Kbps, 512 Kbps, 1024 Kbps, and 2.48 Kbps, regardless of use amount. However, in the present invention, the fee per unit band is calculated based on fee rate by speed to fee graphs of FIGS. 3A and 3B. At the time when the fixed fee system is converted to the measured fee system of the present invention, the fee per unit band is controlled by the marketing policies.

As described above, the unit fee determining unit 220 generates unit fee data of a corresponding traffic by applying the linear proportional fee rate system and the non-linear fee rate system of the tariff function unit 215 in accordance with the charging tariffing policy. Then, the unit fee determining unit 220 transmits the generated unit fee data to the final charging calculating unit 225.

The final charging calculating unit 225 calculates use fee for traffic types through the unit fee data and statistical data calculated by the traffic measuring and statistical unit 210.

The method for calculating the charging fee in accordance with the traffic types will now be described. First, the method for calculating the charging fee of the band reservation type traffic is based on that the maximum value (absolute value) of the available traffic per connection is assigned. At this time, the unit fee is based on the band of the maximum value which is available for connection of a corresponding traffic. The charging fee is calculated based on the unit fee R calculated by the band of the maximum value of the corresponding traffic based on the connection duration T. The method for calculating the charging fee of the band reservation type traffic is as below Equation 7.

Fee of band reservation type traffic=unit fee $R$*connection duration $T$    Equation 7

The method for calculating the charging fee of the band common type traffic is calculated based on the unit fee B which is a fee per bit based on the total transfer amount A by a corresponding service connection. The equation for calculating the unit fee is as below Equation 8.

Fee of band common type traffic=unit fee $B$*total transfer amount $A$    Equation 8

Furthermore, the method for calculating the charging fee of the virtual private line traffic is calculated based on the existing fee per one month B. The unit fee S considering quality of service requirements is charged based on the equivalent band C considering quality of service requirements by calculating use amount of the customer. At this time, the equation for calculating the charging fee of the virtual private line traffic is below Equation 9.

Fee of virtual private line traffic=unit fee $S$*equivalent band $C$    Equation 9

The unit fee per traffic types shown in the above equations 7 to 9 is based on unit fee data of the unit fee determining unit 220.

As aforementioned, the apparatus and method for providing a measured rate system in an IP network have the following advantages.

When providing specific services according to the customer's request on the IP network, the communication network operator assigns a proper band for types of call referring to characteristic of call requested by the customer, to process the traffic. The fee corresponding to the measured rate fee system is charged. Thus, it is possible to prevent customer's unnecessary traffic transfer, thereby improving quality of service. The customer pays the fee corresponding to its network resource, so that efficiency can be improved in view of quality of service to fee rate.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for charging a traffic rate in an IP network comprising the steps of:

a) assigning traffic received in the IP network to one of the traffic types of the group consisting of a band reservation type traffic, a band common type traffic, and a virtual private line traffic;
b) measuring a total of the traffic in accordance with the traffic type, and processing statistical data; wherein if the traffic type is virtual private line traffic, processing statistical data comprises:
   i) calculating values for an average packet arrival rate and a dispersion of the arrival rate using the total amount of the traffic transmitted to and from a customer; and
   ii) calculating an equivalent band required for satisfying an average packet loss rate or an average packet delay required by the customer using the average and dispersion values;
c) determining a unit fee by applying a tariff function to the traffic in accordance with the traffic types; and
d) calculating a total fee for traffic transfer, which will be charged to the customer, by using the statistical data and the unit fee;
wherein the equivalent band is the packet loss rate, determined as $$C_{loss}=(-K+(K^2+d(2mK+r))^{0.5}/d \text{ wherein}$$

$C_{loss}$ is the packet loss rate;
K is a size of a buffer;
d is $-\log L$, wherein L is a packet loss target value; and
r is $d(v^2+m^2)$, wherein m is an average packet arrival rate and $v^2$ is a dispersion of the arrival rate.

2. A method for charging a traffic rate in an IP network comprising the steps of:
a) assigning traffic received in the IP network to one of the traffic types of the group consisting of a band reservation woe traffic, a band common type traffic, and a virtual private line traffic;
b) measuring a total of the traffic in accordance with the traffic type, and processing statistical data; wherein if the traffic type is virtual private line traffic, processing statistical data comprises:
   i) calculating values for an avenge packet arrival rate and a dispersion of the arrival rate using the total amount of the traffic transmitted to and from a customer; and
   ii) calculating an equivalent band required for satisfying an avenge packet loss rate or an average packet delay required by the customer using the average and dispersion values;
c) determining a unit fee by applying a tariff function to the traffic in accordance with the traffic types; and
d) calculating a total fee for traffic transfer, which will be charged to the customer, by using the statistical data and the unit fee;

wherein the equivalent band is the packet delay rat; determined as $$C_{delay}=(e^{-p0}+e^{-p1}+e^{-p2}+ \ldots e^{-pK-1})/d \text{ wherein}$$

$C_{delay}$ is the packet delay rate;
K is a size of a buffer;
p is an attenuation rate, determined as $p=2(C_{loss}-m)/(v^2+m^2-C_{loss}^2)$ wherein
   m in is an avenge packet arrival rate;
   $v^2$ is a dispersion of the arrival rate;
   $C_{loss}$ is the packet loss rate, determined as $C_{loss}=(-K+(K^2+d(2mK+r))^{0.5}/d$ wherein:
      d is $-\log L$, wherein L is a packet loss target value; and
      r is $d(v^2+m^2)$.

3. A method for charging a traffic rate in an IP network comprising the steps of:
a) assigning traffic received in the IP network to one of the traffic types of the group consisting of a band reservation type traffic, a band common type traffic, and a virtual private line traffic;
b) measuring a total of the traffic in accordance with the traffic type, and processing statistical data; wherein if the traffic type is virtual private line traffic, processing statistical data comprises:
   calculating values for an average packet arrival rate and a dispersion of the arrival rate using the total amount of the traffic transmitted to and from a customer; and
   ii) calculating an equivalent band required for satisfying an average packet loss rate or an average packet delay required by the customer using the avenge and dispersion values;
c) determining a unit fee by applying a tariff function to the traffic in accordance with the traffic types; and
d) calculating a total fee for traffic transfer, which will be charged to the customer, by using the statistical data and the unit fee;
wherein the equivalent band is determined as:
   Max[$C_{loss},C_{delay}$]wherein
      $C_{loss}$ is the packet loss rate, determined as $C_{loss}=(-K+(K^2+d(2mK+r))^{0.5}/d$ wherein
         K is a size of a buffer;
         d is $-\log L$, wherein L is a packet loss target value; and
         r is $d(v^2+m^2)$, wherein m is an average packet arrival rate and $v^2$ is a dispersion of the arrival rate;
      $C_{delay}$ is the packet delay rate, determined as $C_{delay}=(e^{-p0}+e^{-p1}+e^{-p2}+ \ldots e^{-pK-1})/d$ wherein
         p is an attenuation rate, determined as $p=2(C_{loss}-m)/(v^2+m^2-C_{loss}^2)$.

* * * * *